United States Patent
Brandt et al.

(10) Patent No.: US 9,634,338 B2
(45) Date of Patent: Apr. 25, 2017

(54) HUMIDIFICATION CELL

(75) Inventors: Torsten Brandt, Forchheim (DE); Armin Datz, Poxdorf (DE); Albert Hammerschmidt, Erlangen (DE); Silke Latzel, Kleinsendelbach (DE); Josef Lersch, Heroldsbach (DE); Arno Mattejat, Erlangen (DE); Walter Stuehler, Hirschaid (DE); Ottmar Voitlein, Lonnerstadt (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 1791 days.

(21) Appl. No.: 12/867,568

(22) PCT Filed: Feb. 9, 2009

(86) PCT No.: PCT/EP2009/051418
§ 371 (c)(1),
(2), (4) Date: Aug. 13, 2010

(87) PCT Pub. No.: WO2009/101036
PCT Pub. Date: Aug. 20, 2009

(65) Prior Publication Data
US 2010/0323251 A1   Dec. 23, 2010

(30) Foreign Application Priority Data
Feb. 13, 2008 (DE) .......... 10 2008 009 055

(51) Int. Cl.
H01M 8/04119 (2016.01)
H01M 8/1018 (2016.01)

(52) U.S. Cl.
CPC ........... *H01M 8/04149* (2013.01); *H01M 2008/1095* (2013.01)

(58) Field of Classification Search
USPC ....... 429/413, 414, 450, 483, 487, 492, 494; 96/11, 12; 95/52
See application file for complete search history.

(56) References Cited

U.S. PATENT DOCUMENTS 6,465,136 B1 * 10/2002 Fenton et al. ............. 429/309
2004/0234833 A1   11/2004 Hartnack et al.
(Continued)

FOREIGN PATENT DOCUMENTS

EP   1298749 A1   4/2003
EP   1435121 B1   5/2005
JP   10172591 A   6/1998

OTHER PUBLICATIONS

JP 10-172591 A, JPO machine translation.*

*Primary Examiner* — Barbara Gilliam
*Assistant Examiner* — Robert S Carrico
(74) *Attorney, Agent, or Firm* — Laurence Greenberg; Werner Stemer; Ralph Locher

(57) ABSTRACT

A humidification cell of a fuel cell apparatus includes a first outer plate and a second outer plate. A gas chamber, a humidification chamber and a water-permeable membrane separating the two chambers, are disposed between the first outer plate and the second outer plate, starting from the first outer plate. A first water-permeable support element that prevents fibers from detaching and also prevents medium flows from blocking narrow gas outlets, is disposed between the first outer plate and the membrane in such a way that the first support element is made of a filter material.

21 Claims, 2 Drawing Sheets

(56) References Cited

U.S. PATENT DOCUMENTS

| | | |
|---|---|---|
| 2006/0147773 A1 | 7/2006 | Steinshnider et al. |
| 2007/0077484 A1* | 4/2007 | Roth .............................. 429/44 |
| 2007/0092773 A1* | 4/2007 | Guo et al. ...................... 429/24 |
| 2007/0287036 A1* | 12/2007 | Kondo et al. .................. 429/13 |
| 2008/0020260 A1 | 1/2008 | Brydon et al. |

* cited by examiner

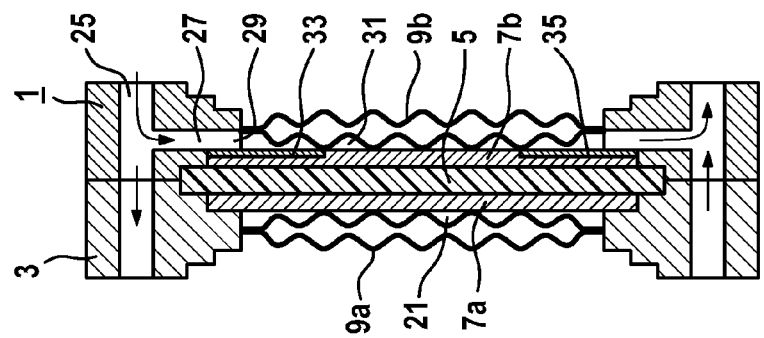
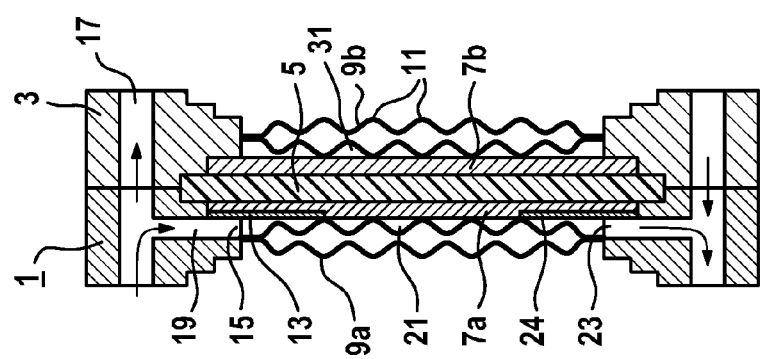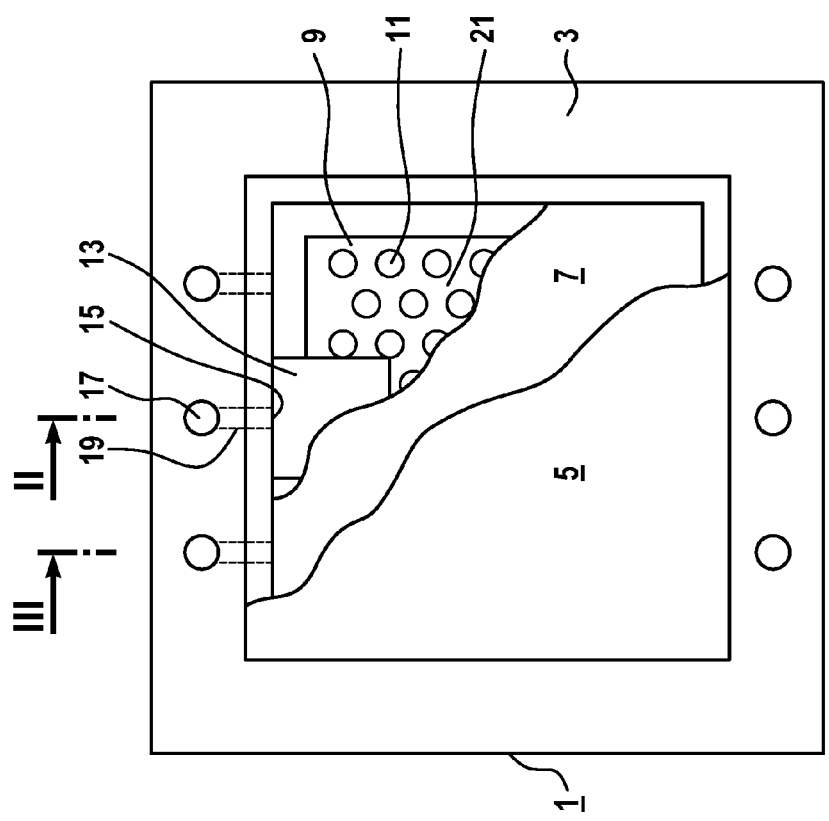

HUMIDIFICATION CELL

BACKGROUND OF THE INVENTION

Field of the Invention

The invention relates to a humidification cell of a fuel cell apparatus. The humidification cell includes a first outer plate and a second outer plate. A gas chamber, a humidification water chamber and a water-permeable membrane separating the two chambers, are disposed between the first outer plate and the second outer plate, starting from the first outer plate. A first water-permeable support element is disposed between the first outer plate and the membrane. Such a humidification cell is known for example from EP 1 435 121 B1.

In a fuel cell electrical power is generated highly efficiently by the electrochemical combination of hydrogen ($H_2$) and oxygen ($O_2$) on an electrolyte, yielding water ($H_2O$). The industrial implementation of this fuel cell principle has led to different solutions, specifically with different electrolytes and operating temperatures of between 60° C. and 1000° C. As a function of their operating temperature fuel cells are classified as low-, medium- and high-temperature fuel cells, which in turn differ from one another through different industrial embodiments.

The fuel cells of a fuel cell arrangement are supplied during operation with operating gases—i.e. a hydrogen-containing fuel gas and an oxygen-containing oxidation gas. Some embodiments of low-temperature fuel cells, in particular fuel cells with a polymer electrolyte membrane (PEM fuel cells), require humidified operating gases to operate. These operating gases are saturated with steam in a suitable apparatus, such as for example a liquid ring compressor or a membrane humidifier. Together with the fuel cell arrangement, the humidification apparatus and any other supply apparatuses form a fuel cell apparatus.

If the operating gases are fed from the humidifier to the fuel cell arrangement by long operating gas feed lines, along this path the temperature of a humidified operating gas may drop due to loss of heat to the surrounding environment. This leads to condensation of humidification water. The operating gases are then reheated in the fuel cells, whereby their relative humidity is reduced. This damages the electrolyte, which has to be kept permanently moist and is extremely sensitive to dryness, its service life thus being reduced. It is therefore desirable for the humidifier to be arranged as close as possible to the fuel cells.

A fuel cell block is known from EP 1 435 121 B1 which has a stack of planar fuel cells and a stack of planar humidification cells. The two stacks are arranged immediately adjacent to one another in the fuel cell block. The humidification cells take the form of membrane humidifiers, in which there are arranged between a first outer plate and a second outer plate, starting from the first outer plate, a gas chamber, a humidification water chamber and a water-permeable membrane separating the two chambers, a water-permeable support element being arranged between the membrane and the first outer plate.

Before the operating gases are fed to the fuel cells of the fuel cell stack, they flow through the humidification cells, are humidified there and then flow, without leaving the fuel cell block again, into the fuel cell stack.

The humidification water flows in the humidification water chamber, i.e. on the one side of the membrane, and the operating gas flows in the gas chamber, i.e. on the other side of the membrane, through channels which are incorporated into the respective outer plate. To prevent the membrane from being masked along webs of the outer plates by said webs, such that no humidification water or operating gas can reach the membrane, a water-permeable support element is arranged in each case between the membrane and one or both of the outer plates. In this way the membrane is held at a distance from the outer plate in the region of the support element and it is thus ensured that humidification water or operating gas may reach the membrane over a large area, so increasing humidification capacity. This is particularly important when using large-area structures in the outer plate. Depending upon on which side of the membrane the support element is arranged, the humidification water penetrates either firstly the support element and then the membrane or firstly the membrane and then the support element and in this way reaches the operating gas to be humidified.

At least the support element between the membrane and the second outer plate here advantageously consists of carbon paper. The carbon paper is stable relative to the operating media used or the membrane material and preferably has hydrophilic characteristics, i.e. is completely wetted by the water. Due to its hydrophilicity and large surface area, the carbon paper ensures good humidification and any water droplets which may arise due to hydrostatic pressure are distributed over the surface and entrained in gaseous form in the gas chamber by the gas stream. The mechanical forces between the membrane and the outer plate(s) are absorbed well by the carbon paper, with direct contact between the membrane and the outer plate(s), and thus corrosion, additionally being avoided.

A disadvantage which has become apparent when using carbon paper is that, at high gas velocities across the carbon paper, carbon fibers may become detached, which may be entrained by the gas stream. This may lead to blockages at narrow gas passages for the media streams, which may in turn result in failure of the fuel cell apparatus.

BRIEF SUMMARY OF THE INVENTION

It is therefore an object of the present invention to provide a humidification cell with which such problems may be prevented.

This object is achieved with a humidification cell of a fuel cell apparatus. The humidification cell includes a first outer plate and a second outer plate. A gas chamber, a humidification water chamber and a water-permeable membrane separating the two chambers, are disposed between the first outer plate and the second outer plate, starting from the first outer plate. A first water-permeable support element is disposed between the first outer plate and the membrane. The first support element is made from a screen fabric. Advantageous configurations are in each case the subject matter of the subclaims.

According to the invention, the first water-permeable support element arranged between the first outer plate and the membrane is made not from carbon paper but rather from a screen fabric. As measurements surprisingly show, it is also possible to achieve 100% gas humidification with a screen fabric, without liquid water in the form of water droplets being entrained by the operating gas in the gas chamber, which may lead to restricted functionality of fuel cells due to the introduction of water. Since the screen fabric is produced by a yarn weaving process and not from short fibers, short fibers cannot become detached, as when carbon paper is used, which may lead to blockages at critical narrow points.

A second water-permeable support element is preferably arranged between the membrane and the second outer plate, which second support element is preferably likewise made from a screen fabric. If a support element is arranged on each side of the membrane, the membrane may be held particularly reliably in a desired position. Irrespective of whether the membrane is connected firmly with the support element(s) or is clamped detachably between the support elements, partial masking of the membrane by the outer plates in the region of the support elements is not possible. This ensures that the membrane displays a reliably high humidification capacity.

The screen fabric preferably consists of plastics, preferably of polypropylene or polyester. Polypropylene or polyester in particular display an appropriate stability relative to the operating gases, the highly acidic ion exchange membrane conventionally used and the temperatures which arise. Due to their mechanical characteristics (deformation, strength), these materials are in a position to absorb the mechanical forces occurring, without being damaged or damaging the neighboring components. High performance plastics are alternatively also suitable. Polyetheretherketone (PEEK) or polysulfone (PSU) is particularly suitable with regard to the temperatures, operating media and mechanical requirements found in humidification cells.

Preferably, the screen fabric and the membrane are matched to one another, and to the pressures in the chambers adjoining the membrane, with regard to the thickness and the diameter of the pores of the former and to the rigidity of the latter, such that, when the humidification cell is in operation, the membrane does not squeeze through the pores and come into contact with the outer plate. In this way impaired humidification capacity and corrosion problems can be avoided in the case of metallic outer plates. The screen fabric is then similarly "leakproof" to a corresponding carbon paper despite the pores.

The underlying consideration here is that, as a result of the pressure of the operating media in the chambers adjoining the membrane (i.e. the gas chamber and the humidification water chamber), a force acts on the membrane, which forces the membrane into the pores of the screen fabric. The membrane is forced all the more into the pores, the greater is the force acting on the membrane in the direction of the screen fabric and the less rigid it is and the greater the pore diameter and the smaller the thickness of the screen fabric.

According to a particularly advantageous configuration of the invention, the screen fabric comprises pores with a diameter which is in a ratio to the thickness of the screen fabric of 1:2 to 1:5, in particular of 1:3 to 1:4. With such a pore diameter and such a fabric thickness, it is possible to achieve particularly good mechanical strength for the support element.

Preferably the screen fabric comprises pores with a diameter of 50 µm to 150 µm, in particular of 90 µm to 110 µm, and the screen fabric comprises a thickness of 200 µm to 500 µm, in particular of 300 µm to 400 µm. With such a pore diameter and such a fabric thickness, it is possible with conventional commercial membranes to achieve at the same time particularly good mechanical properties of the support element, a particularly good humidification capacity and good anticorrosion protection of the outer plate.

Particularly stable mounting of the membrane and a particularly simple structure of the humidification cell is achieved in that the first outer plate, the first support element, the membrane, the second support element and the second outer plate in each case rest against one another. In this case, the outer plates conveniently comprise channels or projections, through which the operating gas or the humidification water may flow along the outer plate and along the support element resting against the outer plate. In this configuration the humidification cell forms a particularly stable assembly largely insensitive to pressure. This configuration of the invention is particularly suitable for very shallow humidification cells with a very shallow gas chamber and/or humidification water chamber.

The support element may completely cover the area of the membrane accessible to the humidification water or the operating gas. Good support of the membrane is also ensured, however, if the support element covers only part of the flat side of the membrane, for example as a result of recesses in the support element. This ensures unhindered access by the humidification water and operating gas to the membrane, so increasing the humidification capacity of the humidification cell.

BRIEF DESCRIPTION OF THE SEVERAL VIEWS OF THE DRAWING

Exemplary embodiments of the invention are explained in more detail with reference to five figures, in which:

FIG. 1 shows a plan view of a humidification cell shown cut open;

FIG. 2 shows a section through the humidification cell of FIG. 1;

FIG. 3 shows a further section through the humidification cell of FIG. 1;

DESCRIPTION OF THE INVENTION

Figure 4:
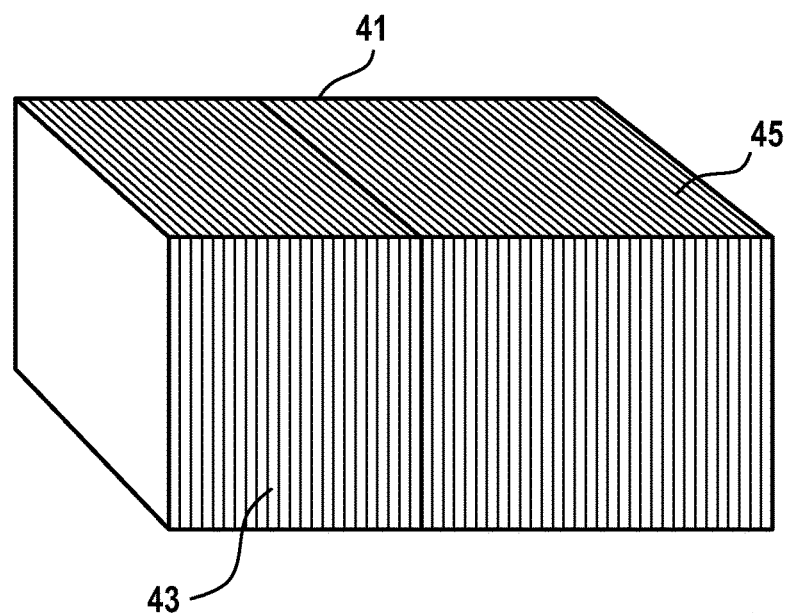
FIG. 4 shows a fuel cell apparatus.

Identical items are provided with identical reference numerals in the figures.

FIG. 1 is a schematic plan view of the basic structure of a rectangular and planar humidification cell 1, which comprises a membrane 5 embedded in a frame of a sealing material 3 and shown cut open. Under the membrane 5 a support element 7 is visible, likewise cut open. Under the support element 7 an outer plate 9 is illustrated, which takes the form of a metal sheet with an embossed structure 11. The embossed structure 11 consists of round elevations or wells within the outer plate 9. Between the outer plate 9 and the support element 7 a masking device 13 is fitted. The masking device 13 is arranged in the region of an operating medium inlet 15.

FIG. 2 shows a section through the humidification cell 1 along the line II-II, wherein here in each case, however, a support element 7a or 7b respectively and an outer plate 9a or 9b respectively are arranged either side of the membrane 5. In detail the humidification cell 1 comprises a first outer plate 9a and a second outer plate 9b. Starting from the first outer plate 9a, between the first outer plate 9a and the second outer plate 9b there are arranged a gas chamber 21, a humidification water chamber 31 and the water-permeable membrane 5 separating the two chambers 21, 31. Between the first outer plate 9a and the membrane 5 there is arranged a first water-permeable support element 7a and between the second outer plate 9b and the membrane 5 there is arranged a second water-permeable support element 7b.

The humidification cell 1 is part of a humidification cell stack of a fuel cell apparatus. During operation of the humidification cell 1 fuel gas flows through the axial channel 17 of the humidification cell 1. The axial channel 17 is oriented parallel to the stack direction of the humidification cell stack. From the axial channel 17 in each case one radial channel 19 branches off to one of the humidification cells 1 of the humidification cell stack. The fuel gas flows through the radial channel 19 and, as it continues, through the operating medium inlet 15, then entering the gas chamber 21 of the humidification cell 1. After leaving the operating medium inlet 15 the fuel gas sweeps without forming significant turbulence on the one hand along the masking device 13 and on the other hand along the outer plate 9 of the humidification cell 1.

The first outer plate 9a takes the form of a heating element, which is composed of two metal sheets. Between the metal sheets there is located a heating water chamber, through which hot heating water flows during operation of the humidification cell 1. This heating water heats both the fuel gas flowing through the humidification cell 1 and the humidification water to approximately the temperature of the fuel cells of the fuel cell apparatus.

In the gas chamber 21 the fuel gas is humidified with humidification water and, after flowing through the gas chamber 21, reaches the operating medium outlet 23 of the gas chamber 21. Flowing through a further radial channel and a further axial channel, it leaves the humidification cell 1 again in the humidified state. Also in the region of the operating medium inlet 23 the support element 7a is masked by a further masking device 24, to prevent turbulence upon inflow of the fuel gas into the operating medium outlet 23.

FIG. 3 shows a section through the humidification cell 1 along the line III-III shown in FIG. 1, wherein here too in each case a support element 7a or 7b respectively and an outer plate 9a or 9b respectively are arranged either side of the membrane 5. This section is taken along an axial channel 25, which guides humidification water during operation of the humidification cell 1. The humidification water flows through the axial channel 25 and arrives through the radial channel 27 at a further operating medium inlet 29. Flowing through this operating medium inlet 29, the humidification water reaches the humidification water chamber 31, and flows between the second outer plate 9b and a masking device 33. Then the humidification water reaches the second support element 7b.

Some of the humidification water penetrates the second support element 7b and reaches the membrane 5. After passing through this water-permeable membrane 5 the humidification water also penetrates the first support element 7a arranged on the other side of the membrane 5. On the side facing the gas chamber 21 of the support element 7a the humidification water evaporates and thus humidifies the fuel gas flowing through the gas chamber 21. A further part of the humidification water flows through the humidification water chamber 31 unused, sweeps along a further masking device 35 and leaves the humidification cell 1 again after flowing through a radial channel and a further axial channel.

The second outer plate 9b also takes the form of a heating element, which is composed of two metal sheets. Between the metal sheets there is located a heating water chamber, through which hot heating water flows during operation of the humidification cell 1. This heating water heats the humidification water flowing through the humidification water chamber 31 to approximately the temperature of the fuel cells of the fuel cell apparatus.

The two support elements 7a and 7b rest detachably against the water-permeable membrane 5 and cover the flat outer sides of the membrane 5 completely apart from a narrow outer edge. The two support elements 7a and 7b form together with the membrane 5 a membrane arrangement which is clamped between the two outer plates 9a, 9b of the humidification cell 1. The support elements 7a, 7b thus rest on the one side against the membrane 5 and on the other side against one of the outer plates 9a, 9b. The membrane 5 is held firmly in position by the support elements 7a, 7b. In addition, the support elements 7a, 7b have the effect of ensuring that the membrane 5 cannot come into contact with the outer plates 9a, 9b at any point and thus be masked by part of the outer plates 9a, 9b.

The support elements 7a, 7b are here made of a plastics screen fabric, which consists of polypropylene or polyester. Alternatively, the plastics screen fabric may also consist of a high performance plastics, in particular of polyetheretherketone (PEEK) or polysulfone (PSU).

The screen fabric in this case comprises pores with a diameter which is in a ratio to the thickness of the screen fabric of 1:2 to 1:5, in particular of 1:3 to 1:4. A pore diameter of 50 μm to 150 μm, in particular of 90 μm to 110 μm, and a fabric thickness of 200 μm to 500 μm, in particular of 300 μm to 400 μm have proven advantageous in principle.

FIG. 4 is a schematic representation of a fuel cell apparatus 41 in the form of a fuel cell block. The fuel cell apparatus 41 comprises a stack of humidification cells 43 and a stack of fuel cells 45. The humidification cells 43 have the same width and height as the fuel cells 45. In this way the fuel cell block has a uniform width and height in the stack direction of the humidification cells 43 and the fuel cells 45 along a stack axis. In addition, the humidification cells 43 have the same thickness as the fuel cells 45, such that the outer shape and the external dimensions of the humidification cells 43 are the same as the outer shape and external dimensions of the fuel cells 45.

Measurements of the current-voltage characteristics and of the humidification capacity taken up when using support elements 7a, 7b of carbon paper in comparison with support elements 7a, 7b of screen fabric display hardly any difference, i.e. the performance of a humidification cell with support elements of screen fabric is comparable with the performance of a humidification cell with support elements of carbon paper, with the added advantage that detachment of carbon fibers and thus blockages at narrow gas passages for the media streams may be avoided. When making the measurements, a screen fabric was used which comprises pores with a diameter of approx. 100 μm with a screen fabric thickness of approx. 350 μm.

Preferably, the screen fabric and the membrane are here matched to one another, and to the pressure in the chambers adjoining the membrane, with regard to the thickness and the diameter of the pores of the former and to the rigidity of the latter, such that, when the humidification cell is in operation, the membrane does not squeeze through the pores and come into contact with the outer plate.

Figure 5:
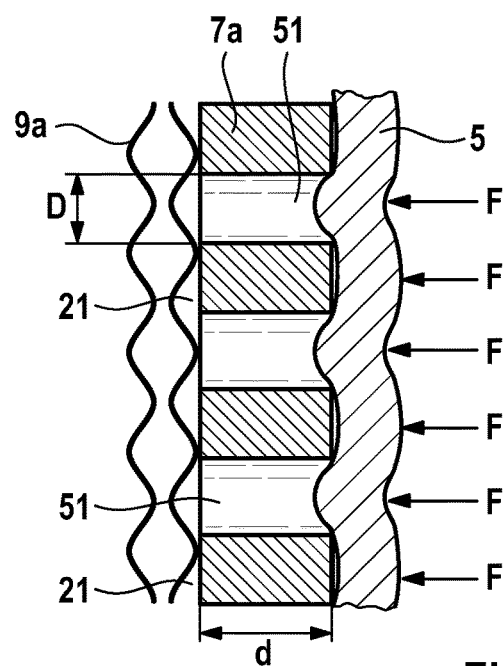
FIG. 5 shows a section through a support element with adjacent membrane and outer plate.

To this end FIG. 5 shows in a highly simplified representation a further section through a support element, here the support element 7a, with an adjacent membrane 5 and an adjacent outer plate 9a.

In the event of the pressure in the gas chamber 21 of the humidification cell 1, which in relation to the membrane 5 is on the same side as the support element 7a or the screen fabric, being less than in the humidification water chamber 31 not shown in any greater detail, which chamber is on the side of the membrane 5 remote from the support element 7a or the screen fabric, a force F acts perpendicularly on the membrane 5 in the direction of the support element 7a or screen fabric, which force forces the membrane 5 into the pores 51 of the support element 7a or of the screen fabric.

The membrane 5 is forced all the more into the pores 51, the greater is the force F acting on the membrane 5, the less rigid it is and the greater the pore diameter D and the smaller the thickness d of the screen fabric of the support element 7*a*.

However, matching as explained above of the screen fabric of the support element 7*a* to the membrane 5 and to the pressures in the gas chamber 21 and the humidification water chamber 31 advantageously prevents the membrane 5 from squeezing through the pores 51 and coming into contact with the outer plate 9*a*.

The invention claimed is:

1. A humidification cell of a fuel cell apparatus, the humidification cell comprising:
    a first outer plate and a second outer plate;
    a gas chamber;
    a humidification water chamber;
    a water-permeable membrane separating said gas and humidification water chambers;
    starting from said first outer plate, said gas chamber, said humidification water chamber and said water-permeable membrane, being disposed between said first outer plate and said second outer plate; and
    a first water-permeable support element disposed between said first outer plate and said membrane, said first support element being made from a screen fabric;
    said membrane having a rigidity;
    said screen fabric and said membrane being matched to one another and to pressures in said chambers adjoining said membrane with regard to said thickness and said diameter of said pores of said screen fabric and with regard to said rigidity of said membrane, for preventing said membrane from squeezing through said pores and coming into contact with at least one of said outer plates, during operation of the humidification cell;
    said screen fabric having a thickness and pores with a diameter; and
    said diameter of said pores and said thickness of said screen fabric being in a ratio of from 1:2 to 1:5.

2. The humidification cell according to claim 1, which further comprises a second water-permeable support element disposed between said membrane and said second outer plate, said second support element also being made from a screen fabric.

3. The humidification cell according to claim 2, wherein said first outer plate, said first support element, said membrane, said second support element and said second outer plate respectively rest against one another.

4. The humidification cell according to claim 2, wherein said screen fabric of said second support element is formed of plastics.

5. The humidification cell according to claim 4, wherein said plastics are formed of a polypropylene or of polyester.

6. The humidification cell according to claim 4, wherein said plastics are polyetheretherketone or polysulfone.

7. The humidification cell according to claim 2, wherein:
    said screen fabric of said second support element has a thickness and pores with a diameter;
    said membrane has a rigidity; and
    said screen fabric of said second support element and said membrane are matched to one another and to pressures in said chambers adjoining said membrane with regard to said thickness and said diameter of said pores of said screen fabric of said second support element and with regard to said rigidity of said membrane, for preventing said membrane from squeezing through said pores and coming into contact with at least one of said outer plates, during operation of the humidification cell.

8. The humidification cell according to claim 2, wherein said screen fabric of said second support element has a thickness and pores with a diameter, and said diameter and said thickness are in a ratio of from 1:2 to 1:5.

9. The humidification cell according to claim 2, wherein said screen fabric of said second support element has a thickness and pores with a diameter, and said diameter and said thickness are in a ratio of from 1:3 to 1:4.

10. The humidification cell according to claim 2, wherein said screen fabric of said second support element has pores with a diameter of from 50 μm to 150 μm.

11. The humidification cell according to claim 2, wherein said screen fabric of said second support element has pores with a diameter of from 90 μm to 110 μm.

12. The humidification cell according to claim 2, wherein said screen fabric of said second support element has a thickness of from 200 μm to 500 μm.

13. The humidification cell according to claim 2, wherein said screen fabric of said second support element has a thickness of from 300 μm to 400 μm.

14. The humidification cell according to claim 1, wherein said screen fabric is formed of plastics.

15. The humidification cell according to claim 14, wherein said plastics are formed of a polypropylene or of polyester.

16. The humidification cell according to claim 14, wherein said plastics are polyetheretherketone or polysulfone.

17. The humidification cell according to claim 1, wherein said diameter and said thickness are in a ratio of from 1:3 to 1:4.

18. The humidification cell according to claim 1, wherein said pores of said screen fabric have a diameter of from 50 μm to 150 μm.

19. The humidification cell according to claim 1, wherein said pores of said screen fabric have a diameter of from 90 μm to 110 μm.

20. The humidification cell according to claim 1, wherein said thickness of said screen fabric is from 200 μm to 500 μm.

21. The humidification cell according to claim 1, wherein said thickness of said screen fabric is from 300 μm to 400 μm.

* * * * *